Aug. 20, 1963   B. VAN ZYL ETAL   3,101,002
DECELEROMETER
Filed Nov. 13, 1961   2 Sheets-Sheet 1

INVENTORS
BERNARD VAN ZYL
PHILIP A. STUDER

BY
ATTORNEYS

INVENTORS
BERNARD VAN ZYL
PHILIP A. STUDER

United States Patent Office 3,101,002
Patented Aug. 20, 1963

3,101,002
DECELEROMETER
Bernard van Zyl, Orlando, Fla., and Philip A. Studer, Silver Spring, Md., assignors, by mesne assignments, to the United States of America as represented by the Secretary of the Navy
Filed Nov. 13, 1961, Ser. No. 152,109
4 Claims. (Cl. 73—514)

This invention relates to an inertia actuated sensing and timing mechanism of the type which may itself be a source of operating energy. More particularly, the invention relates to an energy storing device which may at once provide the dual functions of sensing a degree of acceleration or deceleration and also effecting the operation of various mechanical and electrical devices as, for example, for energizing a delayed spring switch mechanism.

The accelerometer art has long used accelerometers as an acceleration measuring and/or trigger device wherein at a given degree of acceleration a switch or triggering mechanism may be actuated automatically. This has been accomplished mechanically, for example, in a missile, by rotating or unidirectionally driving the accelerometer mass so as to bring into coincidence levers which in turn may close trigger circuits. Electrical switching has also been used in combination with accelerometers as, for example, when arranging a system so that when the accelerated mass has been driven a given amplitude corresponding to a predetermined amount of acceleration or deceleration, responsive electronic means (e.g. switch contacts closing) may trigger the detecting and actuating mechanism. Characteristically such systems have involved many components. Among them would be the mass which is to be accelerated, the spring or restraining means against which the mass is to move in a controlled fashion, channelling or retaining means to direct the movement of the mass either rectilinearly or unirotationally, switch or trigger means of the mechanical or electrical type as seen above, and a source of power which the switch means is to release to act upon a given signal or control device. As one would expect, this combination of varied and necessarily precisely fitting and exactly positioned parts must be arranged very carefully so that cooperation is intimate, of quick response, and accurate. This means that it takes the coordination of many moving parts as well as the weight of these many cooperating parts to make up this small but intricate acceleration triggering system. With the multitude of accelerometer applications and environments today, it is essential, if not crucial, to minimize the weight of such a triggering assembly as well as to reduce the number of cooperating parts which must be intricately fitted. These components are difficult to make and, of course, are open to a multiplicity of possible sources of failure. In addition to this there is the necessary expense involved in producing and fitting these many intricately assembled parts and assuring that they cooperate precisely. Consequently, any improvement in a system today which reduces the mass as well as the number of parts in a triggering device which is apt for precise acceleration measurements in highly subtle and complex systems, as, for example, a missile package, is of utmost importance for military applications, scientific research investigations and business or commercial applications.

Thus, it is seen that improvements in the area of simplifying a system and reducing weight are vital ones in the accelerometer art. These are two of the problems which the instant invention solves. As will appear below, the invention disclosed herein accomplishes simultaneously the dual functions of sensing acceleration and effecting operation of a switching mechanism which is to be triggered in response. It accomplishes these improvements in a manner which also serves to reduce the weight and the number of parts in a system, thus simplifying and miniaturizing it.

The instant invention has been able to dispense with the power source, a switch and a separate battery in an accelerometer device thus reducing weight and the number of parts with the obvious attendant advantages, especially in a missile environment. The instant invention has taken what was heretofore an accelerometer measuring device and introduced the separate and significant function of acting as its own energizer for the trigger means to be actuated by the accelerometer.

It is, therefore, an object of this invention to provide an improved sensing and timing device whereby number of parts and weight are reduced in comparison to prior art devices so as to simplify and miniaturize the mechanism.

It is a further object of this invention to provide a device which may also be utilized to render effective trigger means operatively connected thereto.

A still further object of this invention is to provide a device which, at a predetermined acceleration level may itself effect operation of a switch or other responsive means.

Another object of this invention is to provide a device wherein the mass as it moves under acceleration provides a power source as well as a sensing instrument.

Other objects and many of the attendant advantages of this invention will be readily appreciated as it becomes better understood by reference to the following detailed description when considered in connection with the accompanying drawings wherein.

This device is a gravity actuated sensing and timing mechanism that senses a predetermined value of acceleration or conversely deceleration and performs various mechanical and electrical functions at specific intervals after sensing occurs. The device also has the ability to return to a zero or "steady-state" condtiion if external forces should cease to act upon it.

Figure 1:
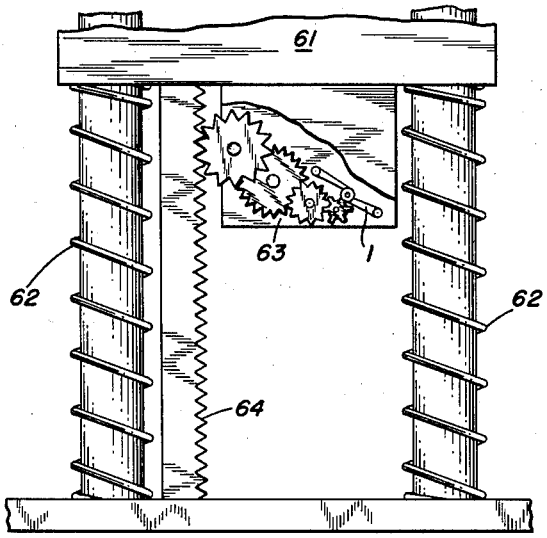
FIG. 1 is a diagrammatic elevational view of a device constructed in accordance with the present invention.
Figure 5:
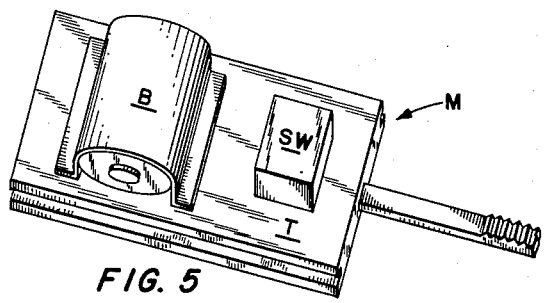
FIG. 5 is a view in perspective of an accelerable mass package wherein other components are used for purposes of constituting the mass.
Figure 6:
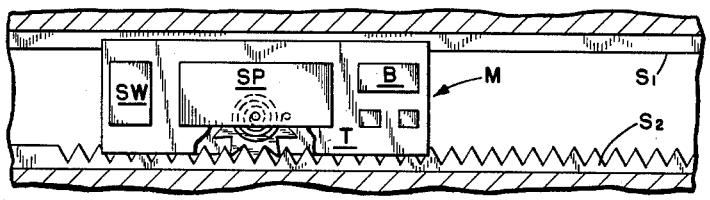
FIG. 6 is a top view of another accelerable mass package including the spring wherein the spring is wound by moving its ratchet along the teeth of the track.

Referring now to the drawings, there is shown in FIG. 1 thereof a sensing and timing device comprising a mass 61 balanced upon a spring system 62 in such a manner that when the mass moves to a desired position under the influence of an external force that is traveling in the downward sense, a fixed rack 64 affixed to mass 61 winds the main spring in the clock system 63 which is mounted externally of 61 and which consists of a barrel, mainspring and Junghans escapement. In the "rest" position, the spring is not wound and when the mass moves downward its rack attached thereto winds the clock mechanism. When the mass comes in its downmost position, the Junghans escapement is released. After a delay determined by the Junghans escapement, functions such as switch actuations and trigger releases may be accomplished. The Junghans escapement is not actuated until the mass reaches the desired position, at which time it is released and the clock runs performing any number of initiating or triggering functions such as closing switches and energizing control systems. It should be noted in this figure and throughout the specification that the mass 61 may comprise any convenient grouping of many of the components used for different other functions such as shown in FIG. 5 wherein the mass consisting of tray with its winding rack attached and situated on which are a battery (B) and switch assembly (SW). FIG. 6 shows a different form of this same general idea.

Figure 2:
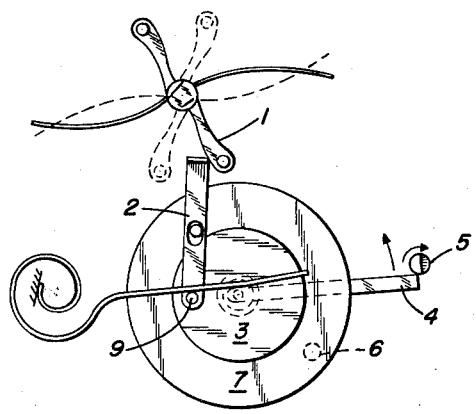
FIG. 2 is an elevation view of the apparatus for starting and locking the Junghans escapement mechanism of FIG. 1.

In FIG. 2 is shown the Junghans escapement starting and locking device used in connection with the clock mechanism of FIG. 1, to control the operation of the aforesaid escapement. This system, which provides the starting and locking of the Junghans escapement, is a method for restraining an escapement lever in a spring-loaded condition so that when it is released the escapement which is inherently a non-self-starting escapement, will be started running. The system also provides a method of recycling, that is, it will move the escapement lever to the locked position without damage to any of the escapement components. The system is initiated by rotating a half shaft 5 enough to allow the release lever 4 to rotate counter clockwise. The indexing spring bears upon the indexing pin 9, is attached to indexing wheel 3 and drives the indexing wheel and its shaft until the indexing pin and indexing spring reach a "dead-center" condition. The rotations of the indexing wheel cause the escapement lock 2 to move beyond the orbit of the escapement lever 1, thus allowing the escapement to run. Recycling is accomplished by driving the recycling wheel 7 by a re-wind motor (not shown). As the recycle wheel rotates the engaging pin 6 comes into contact with the release lever 4 and causes it to rotate about its axes until the indexing pin arrives at a point in its orbit which allows the indexing spring to take over and drive the release lever 4 until the latter comes to rest against the starting half-shaft 5. The system is once again ready for a new cycle of operation. Provision must be made to stop the rewind motor after the indexing spring begins to drive the indexing wheel and also provision must be made to return the half shaft to a locked position prior to the completion of the rewind cycle.

Figure 3:
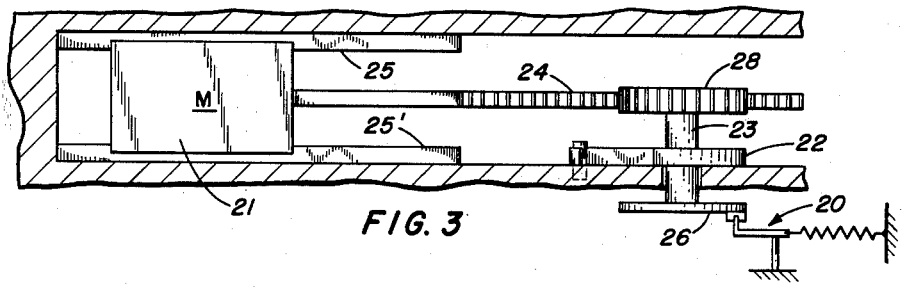
FIG. 3 is a sectional view of an alternate arrangement of FIG. 1, wherein the restraining means itself serves as an operating means.

In FIG. 3 there is shown an arrangement whereby the spring restraining the mass is itself serving as an energizing source. In this arrangement mass 21 which traverses the channel between slides 25 and 25' and has attached to it a winding rack 24 which in turn winds wheel 28 mounted on a shaft 23 on which is in turn mounted a spring 22 to be wound by the movement of this rack 24. Thus, when the mass 21 moves under acceleration or deceleration down the channel and pushes the rack which winds the wheel and the spring attached thereto, the spring 22 serves as a source of energy, being energized with potential mechanical energy and also serves as a restraining spring upon the movement of mass M. Thus, the kinetic energy of moving mass M is converted into potential energy for use to trigger the system later on, and stored by a spring 22. Controlled release of this spring 22 is provided by means of a wheel 26 mounted thereon. This arrangement is illustrative of how the vided by conventional escapement 20, shown attached to device can both sense the amounts of acceleration and charge an "energy-storer" (e.g. spring) to be used in a system actuated by the accelerometer at a predetermined degree of acceleration.

Figure 4:
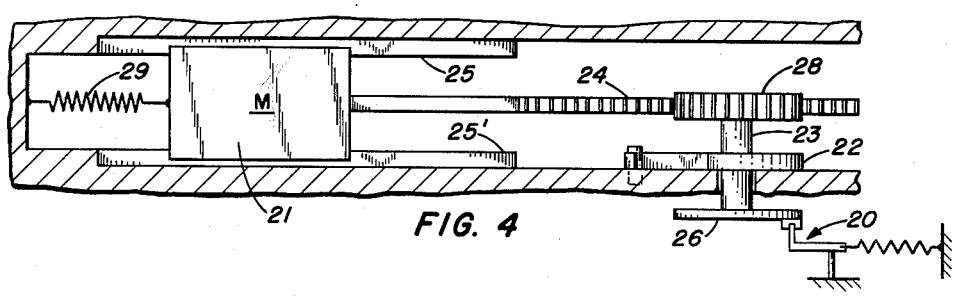
FIG. 4 is a view similar to FIG. 3 illustrating another arrangement of the device wherein a second restraining spring is employed.

In FIG. 4 is shown schematically a system exactly analogous to that of FIG. 3 except that the restraining spring in this instance is a separate, oppositely-mounted spring 29. This figure illustrates simply the concept of using an accelerable mass to wind the actuating spring in a different embodiment.

In FIG. 5 is shown the concept of using additional components together with an accelerable tray to constitute the mass. In this arrangement there is a significant saving in weight due to the fact that instead of a non-functional mass acting as the measured mass in the accelerometer, the mass of the otherwise functional components is itself the measured mass. This, of course, eliminates this non-functional mass and is also an invaluable saving in weight and space. This is a vital feature in a missile package. In the embodiment shown in this figure the mass comprising a tray T on which is situated a battery mechanism B and a switch package SW. With the advent of miniaturized battery and switch components, the form the components may take has become more suitable for mounting on a holding tray as in an illustration and allow them to serve as the accelerable mass.

In FIG. 6 there is shown an arrangement for using the spring means, with its dual energizing and restraining functions, as a part of the sensing mass. In this embodiment there is shown a tray T on which is mounted a component such as switch SW, battery B, and, especially, the spring and clock mechanism which is to serve both as the restraining means for the accelerated mass and as the energizing means for the clock mechanism. As will be apparent from the drawing, when the mass package on the tray moves under acceleration the toothed sidewall S2 of the chute, along which the mass is to move, will turn the wheel W intermeshing with the teeth thereon so as to wind the spring in the spring package SP. In this embodiment not only have a separate restraining spring and non-functional mass been dispensed with, but the combination energizing and restraining spring itself serves as a functional part of the sensing mass. The extreme simplicity and miniaturization of this combination will be apparent to one skilled in the missile packaging art where even a slight saving in space, weight or number of parts is a major objective.

FIG. 1 also illustrates how the restraining spring serves also as an energizing spring for the clock mechanism.

It is to be understood, of course, that the foregoing disclosure relates only to the preferred embodiments of the invention and that various modifications and alterations may be made therein without departing from the spirit and scope of the invention. From the above, it should be obvious that the invention offers a new and improved accelerometer mechanism wherein the inventive features comprise: using the restraining spring of the accelerometer to serve the dual function of restraining the mass and energizing a clock mechanism, making the weight comprising the accelerometer mass functional, in dispensing with all non-functional weight and also in using the movable mass itself to create energy which may be transmitted to a clock sensing or control mechanism.

The principles of the instant invention have wide application in the design of instruments using a moving body as one of the measuring elements. Of course, an obvious application of such a principle is that of the embodiments disclosed and illustrated, namely, inertia actuated devices used to sense acceleration and deceleration. Such devices have wide and useful application in a missile control and detecting system, in aircraft controls and other highly complex instrumentation.

Obviously many modifications and variations of the invention are possible in light of the above teaching. It is, therefore, to be understood that the source of this invention is to be considered as limited only by the scope and limitations of the appended claims.

What is claimed is:

1. In a force sensing and timing apparatus,
a base,
a pair of supports carried by said base,
a mass slidably mounted on each of said supports,
a spring carried by each support of said pair of supports in engagement with said mass and the base for yieldably maintaining the mass in an initial suspended position,
a first toothed member mounted on the base,
a second toothed member movably mounted on the mass and cooperating with said first toothed member,
a clock mechanism mounted on the mass and windable by movement of the second toothed member during movement of the mass from said initial position in response to the force sensed thereby,
said clock mechanism including an escapement device, and
means operatively connected to said escapement device for selectively starting and stopping the escapement device.

2. The apparatus according to claim 1, wherein the means for starting and stopping the escapement device includes
means to block movement of the escapement device,
rotatable means upon which said blocking means is pivotally mounted,
means to rotate said rotatable means, and
means to selectively prevent rotation of the rotatable means.

3. In a sensing and timing apparatus,
a base member,
a pair of mutually spaced supports mounted on the base members,
a mass bridging said supports and slidably mounted thereon,
a coil spring mounted on each support of said pair of supports in engagement with said mass and the base member for yieldably supporting the mass in a suspended position,
a rack mounted on the base member,
a pinion rotatably mounted on the mass and cooperating with said rack,
a clock mechanism including an escapement mounted on the mass and windable by said pinion as the pinion moves along the rack during movement of the mass in response to a sudden shock received thereby, and
means for starting and locking said escapement,
said last named means including blocking means to block movement of the escapement,
rotatable means upon which said blocking means is pivotally mounted,
means to rotate said rotatable means, and
means to selectively prevent rotation of the rotatable means.

4. The apparatus according to claim 3 wherein said means for starting and locking the escapement includes:
a locking lever to block movement of the escapement,
a rotatable indexing wheel having a pin upon which said locking lever is pivotally mounted,
a release lever rigidly mounted on said indexing wheel,
resilient means in engagement with the pin and urging the indexing wheel and release lever in one direction, and
means to selectively block movement of the release lever in said one direction, so that when the release lever is not blocked said resilient means will rotate the indexing wheel and the release lever in a manner to remove the locking lever from blocking relation with respect to the escapement.

References Cited in the file of this patent

UNITED STATES PATENTS

| | | |
|---|---|---|
| 2,486,362 | O'Brien | Oct. 25, 1949 |
| 2,836,118 | Hjelm | May 27, 1958 |
| 2,928,347 | McLean | Mar. 15, 1960 |

FOREIGN PATENTS

| | | |
|---|---|---|
| 198,865 | Switzerland | July 15, 1938 |